United States Patent [19]

Stoney, III et al.

[11] Patent Number: 5,567,519
[45] Date of Patent: Oct. 22, 1996

[54] COMPOSITION FOR USE IN DRY PRODUCTS

[75] Inventors: Clement P. Stoney, III, Bel Air; James W. Stendera, Baltimore, both of Md.; Keith Bridger, Washington, D.C.

[73] Assignee: Martin Marietta Magnesia Specialties, Inc., Raleigh, N.C.

[21] Appl. No.: 102,937

[22] Filed: Aug. 6, 1993

[51] Int. Cl.⁶ ........................................................ B32B 5/16
[52] U.S. Cl. ............................ 428/402; 428/403; 428/404
[58] Field of Search ...................................... 428/403, 404, 428/407, 323, 331, 402; 523/200; 524/320, 321, 2

[56] References Cited

U.S. PATENT DOCUMENTS

| | | | |
|---|---|---|---|
| 3,729,329 | 4/1973 | Morris et al. | 106/58 |
| 3,879,514 | 4/1975 | Dahl | 264/63 |
| 3,926,656 | 12/1975 | Mangels | 106/272 |
| 3,981,821 | 9/1976 | Kiritani et al. | 252/316 |
| 4,324,862 | 4/1982 | Gebler | 501/109 |
| 4,420,341 | 12/1983 | Ferrigno | 106/308 Q |
| 5,300,144 | 4/1994 | Adams | 106/162 |

FOREIGN PATENT DOCUMENTS

| | | |
|---|---|---|
| 54-4138 | 1/1979 | Japan . |
| 1188147 | 10/1985 | U.S.S.R. . |
| 2068356 | 8/1981 | United Kingdom . |

*Primary Examiner*—Hoa T. Le
*Attorney, Agent, or Firm*—Bell, Seltzer, Park & Gibson, P.A.

[57] ABSTRACT

A composition that when added to a dry material that is subsequently compacted, decreases the porosity of the resultant compacted material while improving the density and strength of the compacted material. The substantially dry composition comprises refractory aggregate coated with an organic compound. Preferably the coated aggregate has a size wherein at least 50% of the coated aggregate will pass a 100 mesh screen. Also disclosed is a method for making such a composition.

8 Claims, No Drawings

COMPOSITION FOR USE IN DRY PRODUCTS

FIELD OF THE INVENTION

The present invention relates to a composition that when added to a dry material that is subsequently compacted, e.g. by ramming, vibrating, or other procedures well known in the art, decreases the porosity of the resultant compacted material while improving the density and strength of the compacted material. The composition of the present invention may be advantageously utilized in admixture with a refractory aggregate to produce dry or essentially dry non-aqueous refractory products.

BACKGROUND OF THE INVENTION

Refractory products are often utilized as protective layers to protect the vessels that hold and transfer molten metal in metal casting processes such as steel making. For example, refractory products may be utilized as protective layers to protect furnace bottoms, ladles, and tundishes. The purpose of the protective layer is to protect the brick, safety lining, and steel shell of the vessel from steel and slag penetration. By inhibiting this penetration, the protective layer prolongs the life of the vessel.

Prior practices for forming a refractory product generally use a liquid binder to bind a refractory aggregate and produce the protective layer. The use of water as the liquid is unacceptable with certain aggregates, such as dolomite, due to hydration reactions well known in the art. The use of a non-aqueous liquid binder may disadvantageously produce odors and noxious gases during compaction in hot furnaces.

A particularly desirable type of refractory protective layer, for many uses, is one formed from substantially dry ingredients (i.e. containing little or no liquid). A dry non-aqueous refractory can be produced by admixing the fines of the invention with an appropriate particle size distribution of a coarse basic aggregate. In order to form a monolithic protective layer on the bottom and banks of an electric arc furnace, the dry non-aqueous mixture is spread evenly over the contoured bottom of the vessel to a desired uniform thickness. As the material is installed in the furnace bottom, it is routinely de-aired and vibrated into place. Next the banks are installed to a desired uniform height and contour, de-aired and vibrated into place. The monolithic layer is formed and sintered into place during the production of the first heat in the furnace. Commonly assigned U.S. patent application Ser. No. 07/970,207 filed Nov. 2, 1992, now U.S. Pat. No. 5,300,144, entitled "Binder Composition", the disclosure of which is incorporated herein by reference, discloses further information.

SUMMARY OF THE INVENTION

We have discovered a composition that may be utilized as a lubricant, which when compacted or formed by any of a number of known techniques, e.g. by ramming, vibrating, or other procedures well known in the art, produces a product having improved porosity and density. The composition of the present invention is particularly advantageous for use with dry materials for applications where a liquid medium is not desirable.

The composition of the present invention is a substantially dry composition which comprises a finely ground refractory aggregate which is substantially coated with an organic compound. Preferably, at least 50%, more preferably 80–100% of the coated aggregate passes through a 100 mesh screen. Particles of this size are generally referred to as "fines". Thus, the composition of the present invention may be broadly characterized as organically coated fines.

The composition of the present invention may be admixed with additional aggregates to produce a refractory product of the present invention that may be utilized in manners known to the art, for example in the formation of a protective layer as described above. Since the composition of the present invention is substantially dry, it may advantageously be utilized to produce a dry, vibratable, refractory product. The refractory product may include a binder composition and other ingredients known in the art. Generally 5 to 40% by weight of the composition of the present invention is utilized in the formation of the refractory product, however it is desirable to use an amount of the composition of the present invention that achieves the highest packing fraction in the final product.

The composition of the present invention may also be utilized, in manners that will be apparent to those of ordinary skill in the art, in ceramics and in products formed by powder metallurgy techniques.

An advantage of the composition of the present invention is that when the composition is utilized in admixture with a dry material that is subsequently compacted, the porosity and permeability of the compacted product are decreased, while the density and strength of the compacted product are increased.

Another advantage of the composition of the present invention is that when the composition is utilized in admixture with a dry refractory material, the resultant material remains dry and free-flowing.

A further advantage of the composition of the present invention is that it is nontoxic and non-irritating to workers.

A still further advantage! of the composition of the present invention is that it is substantially odor-free, even during compaction and heating.

A still further advantage of the composition of the present invention is that it is classified as a hazardous, toxic or carcinogenic material and therefore does not require special precautions prior to use.

Further advantages of the composition of the present invention will become apparent from the following more detailed description of the invention.

DETAILED DESCRIPTION OF THE INVENTION

As set forth above, the present invention includes a substantially dry composition which comprises a refractory aggregate and an organic compound wherein the aggregate is substantially coated with the organic compound. Preferably the particle size of the composition of the present invention is a size wherein at least 50%, preferably 80–100% of the coated aggregate pass through a 100 mesh screen. The amount of organic compound is preferably 0.05 to 1.5%, by weight, more preferably 0.5%, by weight of the composition.

Refractory aggregates suitable for use in the composition of the present invention include, but are not limited to refractory aggregates well known to those of ordinary skill in the art. These aggregates include, but are not limited to magnesia, dead burned magnesia, dolomite, dead burned dolomite, alumina, silica, zircon, alumina-silica based refractories, bauxite, graphite and combinations thereof. Magnesia and alumina are the preferred aggregates.

Lubricating organic compounds suitable for use in the present invention include those that have one or more of the following characteristics:

a) the organic compound is substantially non-reactive with refractory aggregates at 20°–25° C.;

b) the organic compound exists in a solid phase as a dry powder;

c) the organic compound should produce a composition that when admixed with aggregate, produces a refractory product that upon compaction exhibits decreased porosity and permeability, and increased density and strength;

d) the organic compound is substantially odor free, non-toxic and non-irritating to workers. Preferably, the organic compound should comprise a polar head, and a hydrocarbon chain comprising at least 12 carbon atoms (hydrocarbon chain $\geq C_{12}$).

Suitable organic compounds, include, but are not limited to:

a) long-chain fatty acids and their metal salts, wherein long chain refers to a hydrocarbon chain of at least 12 carbon atoms, and metal salts include, for example, metal stearates of sodium (Na), magnesium (Mg), calcium (Ca) and zinc (Zn);

b) surfactants, including anionic, cationic surfactants and non-ionic surfactants;

c) polymers having both hydrophilic and hydrophobic blocks, for example partially hydrolyzed polyvinylacetate (commonly known as polyvinyl alcohol) or polyethylene glycol bonded to such hydrophobic blocks as polystyrene, polyvinyl or acrylic chains, stearyl alcohol, and so forth.

The composition of the present invention may be produced by co-milling the refractory aggregate with the organic compound. Preferably, the starting average particle size of the refractory aggregate is not limited. More preferably, the starting average particle size of the refractory aggregate is not greater than approximately ⅛ inch in diameter due to milling and production efficiency. Also preferably, the amount of organic compound utilized is 0.05 to 1.5%, more preferably 0.5%, by weight of the composition. The co-milling is continued until the aggregate particles are substantially completely coated with the organic compound and have achieved a sizing wherein at least 50%, preferably 80–100% of the coated aggregate particles, will pass a 100 mesh screen. A preferred milling method is ball milling due to its high shear and rapid size reduction capabilities. During milling, fluxing materials for example phosphates, and iron-oxides, known in the art to promote sintering and ceramic bond development, may be added.

As will be recognized by those of ordinary skill in the art, the composition of the present invention may be produced by means other than milling. For example, the coating may be achieved by applying the organic compound, by solvent drying and/or high shear mixing to a fine particle size.

It is generally advantageous, in the production of the composition of the present invention, to utilize a coarse aggregate, having an average particle size of much larger than the final desired size. For example, with refractory materials, it would be generally advantageous to use an average particle size of approximately ⅛ inch in diameter, as a starting material. The use of an aggregate with this particle size promotes a more consistent coating of the organic compound around the aggregate due to the milling time necessary to reduce the size of the coarse aggregate to the particle size desired in the composition of the present invention. Starting with a finer aggregate might decrease the milling time, however, this could lead to a less homogeneous coating of the organic compound, as the aggregate could quickly become too fine for the intended final use if milling was continued.

After milling to the desired particle size is completed, the composition of the present invention is admixed with coarser refractory aggregates to produce a refractory material of the present invention that may be subsequently compacted and/or formed. The coarser refractory aggregates include the refractory aggregates well known to those of ordinary skill in the art. These aggregates include, but are not limited to, magnesia, dead burned magnesia, dolomite, dead burned dolomite, alumina, silica, zircon, aluminasilica based refractories, bauxite, graphite and combinations thereof. The choice of the particular aggregate depends on the intended use of the refractory material and is within the skill of one of ordinary skill in the art. A binder may also be included, with the aggregate and the composition of the present invention, in the refractory material. As discussed above, an advantage of the composition of the present invention is that it is substantially dry and may be utilized to form a substantially dry, vibratable, refractory material. Therefore, it is preferred that a binder, or other additives known in the art, added to the refractory material be substantially dry.

As will be recognized frown the foregoing discussion, the composition of the present invention may be advantageously used in a method for increasing the density and strength of a compacted refractory material while decreasing the porosity of the compacted material. Accordingly, the present invention includes a method for increasing the density and strength of a compacted material comprising: incorporating a substantially dry composition comprising a refractory material substantially coated with an organic compound, into a refractory product. The method of the present invention also includes a method for producing a refractory product comprising: admixing a substantially dry composition comprising a refractory material substantially coated with an organic compound and a refractory aggregate, and then subsequently compacting the mixture. The method of the present invention is further illustrated in the Examples set forth below.

It should be understood that, although one method for using the composition of the present invention is described herein, the composition of the present invention may be used in a variety of other manners, for example in ceramics and powder metallurgy, within the skill of those of ordinary skill in the art. Additional details concerning the preparation and use of the composition of the present invention and its features will become apparent from the following Examples.

EXAMPLE 1

This example illustrates the production and use of a composition of the present invention.

A composition of the present invention was prepared by co-milling MgO aggregate, having an average starting particle size of ⅛" with 0.5 weight percent of sodium stearate and 1.5 weight percent of phosphate, a fluxing material. Co-milling was continued until the MgO was substantially coated with the sodium stearate and ≧90% of the coated aggregate passed through a 100 mesh screen.

This composition was utilized to form a refractory product of the present invention by dry blending 52%, by weight of a 98% MgO periclase aggregate having a graded particle size distribution (81% passing 6 mesh, 62% passing 16 mesh, 22% passing 100 mesh) with 30% dead burned dolomite (99% passing 20 mesh, 15% passing 100 mesh) and with 18% by weight of the composition of the present invention. The mixture was dry blended until well mixed and then poured into 2 inch in diameter unwaxed cardboard cylinders and vibrated, with ramming as necessary, to condense the mixture as described in ASTM Procedure C 181-82.

For comparison purposes, a control refractory product was also produced. The control refractory was produced by blending 52%, by weight, of a 98% MgO periclase aggregate of graded particle size distribution (81% passing 6 mesh, 62% passing 16 mesh, 22% passing 100 mesh) with 30% dead burned dolomite (99% passing 20 mesh, 15% passing 100 mesh) and with 18% by weight of 98% MgO aggregate (98% passing 50 mesh, 92% passing 100 mesh) having essentially the same sizing as the composition of the present invention.

The mixture was dry blended until well mixed and then poured into 2 inch in diameter unwaxed cardboard cylinders and vibrated, with ramming as necessary, to condense the mixture as described in ASTM Procedure C 181-82.

Upon testing, according to the procedure described in ASTM C838-91, the cylinders containing the refractory product of the present invention had an average density of 172.2 pounds per cubic foot (lbs./ft.$^3$) and the cylinders containing the control refractory product had an average density of 157.3 lbs./ft.$^3$.

This illustrates that the composition of the present invention may be utilized in a refractory product to increase the density of the product after compaction.

EXAMPLE 2

This example also illustrates the production and use of a composition of the present invention.

A composition of the present invention was prepared, in a 4000 gram (g) batch, by co-milling MgO aggregate, having an average starting particle size of ⅛ inch in diameter, with 0.5%, by weight of the final composition, sodium stearate and 1.5%, by weight of the final composition, phosphate. Co-milling was continued until the MgO was substantially coated with the sodium stearate and ≧90% the coated aggregate passed through a 100 mesh screen.

This composition was utilized to form a refractory product of the present invention by dry blending 52%, by weight, of an 88% MgO coarse aggregate (78% passing 6 mesh, 29% passing 16 mesh, 5% passing 100 mesh), 30%, by weight, dead burned dolomite and 18%, by weight of the composition of the present invention. The mixture was dry blended until well mixed and then poured into 2 inch in diameter unwaxed cardboard cylinders and vibrated, with ramming as necessary, to condense the mixture as described in ASTM Procedure C 181-82.

For comparison purposes, a control refractory product was also produced. The control refractory product was produced by blending 52%, by weight, of the 88% MgO coarse aggregate, 30%, by weight, dead burned dolomite, and 18% by weight of an 88% MgO aggregate, having essentially the same sizing as the composition of the present invention. The mixture was dry blended until well mixed and then poured into 2 inch diameter unwaxed cardboard cylinders and vibrated, with ramming as necessary, to condense the mixture as described in ASTM Procedure C 181-82.

Upon testing, according to the procedure described in ASTM C838-91, the cylinders containing the refractory product of the present invention had an average density of 174.6 lbs./ft.$^3$ and the cylinders containing the control refractory product had an average density of 159.4 lbs./ft.$^3$.

This further illustrates that the composition of the present invention may be utilized in a refractory product to increase the density of the product after compaction.

EXAMPLE 3

This example illustrates the production and use of a composition of the present invention.

A composition of the present invention was prepared, in a 4000 gram (g) batch, by co-milling Al$_2$O$_3$ aggregate, having an average starting particle size of ⅛ inch in diameter, with 0.5%, by weight of the final composition, sodium stearate. Co-milling was continued until the Al$_2$O$_3$ was substantially coated with the sodium stearate and ≧90% of the coated aggregate passed through a 100 mesh screen.

This composition was utilized to form a refractory product of the present invention by dry blending 82%, by weight, of an Al$_2$O$_3$ coarse aggregate having a particle size similar to the MgO coarse aggregate in Example 1, with 18%, by weight of the composition of the present invention. The mixture was dry blended until well mixed and then poured into 2 inch in diameter unwaxed cardboard cylinders and vibrated, with ramming as necessary, to condense the mixture as described in ASTM Procedure C181-82.

For comparison purposes, a control refractory product was also produced. The control refractory product was produced by blending 82%, by weight, of the Al$_2$O$_3$ coarse aggregate with 18%, by weight of Al$_2$O$_3$ aggregate, having essentially the same sizing as the composition of the present invention. The mixture was dry blended until well mixed and then poured into 2 inch in diameter unwaxed cardboard cylinders and vibrated, with ramming as necessary, to condense the mixture as described in ASTM Procedure C181-82.

Upon testing, according to the procedure described in ASTM C838-91, the cylinders containing the refractory product of the present invention had an average density of 186.0 pounds per cubic foot (lbs./ft.$^3$) and the cylinders containing the control refractory product had an average density of 178 lbs./ft.$^3$.

This further illustrates that the composition of the present invention may be utilized in a refractory product to increase the density of the product after compaction. This example also illustrates the efficacy of the present invention in the absence of a fluxing material.

EXAMPLE 4

This example illustrates the production and use of a composition that includes mineral oil as the organic compound.

A first composition was prepared by co-milling MgO aggregate, having an average starting particle size of ⅛ inch in diameter, with 0.5%, by weight of the final composition, mineral oil. Co-milling was continued until the MgO aggregate was substantially coated with the mineral oil and ≧90% the coated aggregate passed through a 100 mesh screen.

This first composition was utilized to form a refractory product by dry blending 52%, by weight, of a MgO coarse aggregate having a particle size similar to the MgO coarse aggregate in Example 1, 30% by weight dead burned dolomite and 18%, by weight of the first composition. The mixture was dry blended until well mixed and then poured into 2 inch in diameter unwaxed cardboard cylinders and vibrated, with ramming as necessary, to condense the mixture as described in ASTM Procedure C181-82.

For comparison purposes, a second refractory product was also produced. The second refractory product was produced by blending 52%, by weight, of the MgO coarse aggregate, 30% by weight dead burned dolomite and 18%, by weight of a MgO aggregate, having essentially the same sizing as the first composition. The mixture was dry blended until well mixed and then poured into 2 inch in diameter unwaxed cardboard cylinders and vibrated, with ramming as necessary, to condense the mixture as described in ASTM Procedure C 181-82.

Upon testing, according to the procedure described in ASTM C838-91, the cylinders containing the refractory product utilizing the first composition had an average density of 159.3 pounds per cubic foot (lbs./ft.$^3$) and the cylinders containing the control refractory product had an average density of 157.3 lbs./ft.$^3$.

This illustrates that mineral oil has only a minimal effect on increasing the density of the compacted mass. Therefore, mineral oil is not a preferred organic compound for use in the composition of the present invention.

EXAMPLE 5

This example provides another illustration of the production and use of a composition containing ethoxylated ethylene bis stearamid as the organic compound.

A composition of the present invention was prepared, in a 4000 gram (g) batch, by co-milling MgO aggregate, having an average starting particle size of ⅛ inch in diameter, with 0.5%, by weight of the final composition of a short chained (1–2 ethoxy units), ethoxylated ethylene bis stearamid (ethox) having a $C_{18}$ carbon chain. Co-milling was continued until the MgO was substantially coated with the ethoxylated ethylene bis stearamid and ≧90% the coated aggregate passed through a 100 mesh screen.

This composition was utilized to form a refractory product of the present invention by dry blending 52%, by weight, of a MgO coarse aggregate having a particle size similar to the MgO coarse aggregate in Example 1, 30% by weight dead burned dolomite and 18%, by weight of the above composition. The mixture was dry blended until well mixed and then poured into 2 inch in diameter unwaxed cardboard cylinders and vibrated, with ramming as necessary, to condense the mixture as described in ASTM Procedure C 181-82.

For comparison purposes, a control refractory product was also produced. The control refractory product was produced by blending 52%, by weight, of the MgO coarse aggregate, 30% by weight dead burned dolomite and 18%, by weight of a MgO aggregate, having essentially the same sizing as the composition of the present invention. The mixture was dry blended until well mixed and then poured into 2 inch in diameter unwaxed cardboard cylinders and vibrated, with ramming as necessary, to condense the mixture as described in ASTM Procedure C181-82.

Upon testing, according to the procedure described in ASTM C838-91, the cylinders containing the refractory product of the above composition had an average density of 164.3 pounds per cubic foot (lbs./ft.$^3$) and the cylinders containing the control refractory product had an average density of 158.1 lbs./ft.$^3$.

This illustrates that an organic compound having a relatively short ethoxy chain (hydrophilic head) may be utilized in the composition of the present invention to increase the density of a refractory product after compaction.

EXAMPLE 6

This example illustrates the production and use of a composition that includes a wax form of polyoxyethylene (POE) as the organic compound.

A first composition was prepared by co-milling a MgO aggregate, having an average starting particle size of ⅛ inch in diameter, with 0.5%, by weight of the first composition, of POE and 1.5%, by weight of the first composition, of phosphate, a fluxing material. Co-milling was continued until the MgO aggregate was substantially coated with the POE and ≧90% the coated aggregate passed through a 100 mesh screen.

This first composition was utilized to form a refractory product by dry blending 52%, by weight, of a MgO coarse aggregate having a particle size similar to the MgO coarse aggregate in Example 1, 30% by weight dead burned dolomite and 18%, by weight of the first composition. The mixture was dry blended until well mixed and then poured into 2 inch in diameter unwaxed cardboard cylinders and vibrated, with ramming as necessary, to condense the mixture as described in ASTM Procedure C181-82.

For comparison purposes, a second refractory product was also produced. The second refractory product was produced by blending 52%, by weight, of the MgO coarse aggregate, 30% by weight dead burned dolomite and 18%, by weight of a MgO aggregate, having a essentially the same sizing as the composition of the present invention. The mixture was dry blended until well mixed and then poured into 2 inch in diameter unwaxed cardboard cylinders and vibrated, with ramming as necessary, to condense the mixture as described in ASTM Procedure C 181-82.

Upon testing, according to the procedure described in ASTM C838-91, the cylinders containing the refractory product utilizing the first composition had an average density of pounds per cubic foot (lbs./ft.$^3$) and the cylinders containing the control refractory product had an average density of lbs./ft.$^3$. However, volume expansion of the refractory product containing the first composition when heated, proved detrimental.

This illustrates that POE is not a preferred organic compound for use in the composition of the present invention.

EXAMPLE 7

This example illustrates the production and use of a composition of the present invention using magnesium stearate.

A composition of the present invention was prepared, in a 4000 gram (g) batch, by co-milling MgO aggregate, having an average starting particle size of ⅛ inch in diameter, with 0.5%, by weight of the final composition, magnesium stearate and 1.5%, by weight of the final composition, phosphate, a fluxing material. Co-milling was continued until the MgO was substantially coated with the sodium stearate and >90% the coated aggregate passed through a 100 mesh screen.

This composition was utilized to form a refractory product of the present invention by dry blending 52%, by weight, of a MgO coarse aggregate having a particle size similar to the MgO coarse aggregate in Example 1, 30% by weight dead burned dolomite and 18%, by weight of the composition of the present invention. The mixture was dry blended until well mixed and then poured into 2 inch in diameter unwaxed cardboard cylinders and vibrated, with ramming as necessary, to condense the mixture as described in ASTM Procedure C181-82.

For comparison purposes, a control refractory product was also produced. The control refractory product was produced by blending 52%, by weight, of the MgO coarse aggregate, 30% by weight dead burned dolomite and 18%, by weight of a MgO aggregate, having essentially the same sizing as the composition of the present invention. The mixture was dry blended until well mixed and then poured into 2 inch in diameter unwaxed cardboard cylinders and vibrated, with ramming as necessary, to condense the mixture as described in ASTM Procedure C181-82.

Upon testing, according to the procedure described in ASTM C838-91, the cylinders containing the refractory product of the present invention had an average density of 172.8 pounds per cubic foot (lbs./ft.$^3$) and the cylinders containing the control refractory product had an average density of 159 lbs./ft.$^3$.

This illustrates that the composition of the present invention including magnesium stearate, may be utilized in a refractory product to increase the density of the product after compaction.

EXAMPLE 8

This example illustrates the production of a composition of the present invention using admixing instead of co-milling and the use of the composition.

A composition of the present invention was prepared, in a 4000 gram (g) batch, by admixing MgO aggregate, in powder form with 0.5%, by weight of the final composition, sodium stearate and 1.5%, by Weight of the final composition, phosphate. Admixing was continued until the MgO was substantially coated with the sodium stearate and ≧90% the coated aggregate passed through a 100 mesh screen.

This composition was utilized to form a refractory product of the present invention by dry blending 52%, by weight, of a MgO coarse aggregate having a particle size similar to the MgO coarse aggregate in Example 1, 30% by weight dead burned dolomite and 18%, by weight of the composition of the present invention. The mixture was dry blended until well mixed and then poured into 2 inch in diameter unwaxed cardboard cylinders and vibrated, with ramming as necessary, to condense the mixture as described in ASTM Procedure C181-82.

Upon testing, according to the procedure described in ASTM C838-91, the cylinders containing the refractory product of the present invention had an average density of 163.2 pounds per cubic foot (lbs./ft.3).

This illustrates that co-milling the ingredients to form the composition of the present invention achieves better results than admixing the ingredients. However, this example also illustrates that forming the composition of the present invention by admixing produces a composition that imparts increased density to refractory products.

We claim:

1. A compactible refractory product comprising: first refractory aggregate particles substantially coated with 0.05 to 1.5% by weight, of a lubricating organic compound comprising a polar head and a hydrocarbon chain of at least 12 carbon atoms admixed with an uncoated coarser second refractory aggregate, said refractory product being free-flowing and at least 50% of the coated first refractory aggregate particles being able to pass through a 100 mesh screen.

2. The refractory product of claim 1, wherein said lubricating organic compound is a fatty acid.

3. The refractory product of claim 1, wherein said lubricating organic compound is a metal salt of a fatty acid.

4. The refractory product of claim 1, wherein said lubricating organic compound is a surfactant.

5. The refractory product of claim 1, wherein said lubricating organic compound is a polymer having hydrophobic blocks and hydrophilic blocks.

6. The refractory product of claim 1, wherein said coated first refractory aggregate particles comprises 5 to 40% by weight of the refractory product.

7. The refractory product of claim 1, wherein said refractory product, when compacted, exhibits an increased density relative to the same refractory product without said lubricating organic compound.

8. The refractory product of claim 7, wherein said increased density ranges from about 3.9% to about 9.5%.

* * * * *

UNITED STATES PATENT AND TRADEMARK OFFICE
CERTIFICATE OF CORRECTION

PATENT NO. : 5,567,519
DATED : October 22, 1996
INVENTOR(S) : Stoney et al.

It is certified that error appears in the above-indentified patent and that said Letters Patent is hereby corrected as shown below:

Col. 2, line 36, replace "advantage!" with --advantage--;

Col. 2, line 40, after "it is" insert --not--;

Col. 5, line 22, replace "C 181-82" with --C181-82--;

Col. 5, line 56, replace "C 181-82" with --C181-82--;

Col. 7, line 15, replace "C 181-82" with --C181-82--;

Col. 8, line 37, replace "C 181-82" with --C181-82--;

Col. 8, line 62, replace ">" with --≥--.

Signed and Sealed this

Eighteenth Day of March, 1997

Attest:

BRUCE LEHMAN

*Attesting Officer*     *Commissioner of Patents and Trademarks*